United States Patent [19]

Capecchi

[11] Patent Number: 4,585,405
[45] Date of Patent: Apr. 29, 1986

[54] APPARATUS FOR HANDLING TIRES TO AND FROM A VULCANIZING MACHINE

[75] Inventor: Floriano Capecchi, Pistoia, Italy
[73] Assignee: Cima Impianti S.p.A., Italy
[21] Appl. No.: 706,024
[22] Filed: Feb. 27, 1985
[30] Foreign Application Priority Data Feb. 29, 1984 [IT] Italy ................. 9349 A/84

[51] Int. Cl.⁴ .............................. B29H 5/02
[52] U.S. Cl. .................. 425/18; 425/34 R; 425/38
[58] Field of Search ............ 425/18, 19, 20, 23, 425/34, 38

[56] References Cited

U.S. PATENT DOCUMENTS

| | | | |
|---|---|---|---|
| 1,326,874 | 12/1919 | Macbetto et al. | 425/38 |
| 2,323,767 | 12/1965 | Harris | 425/38 X |
| 2,923,527 | 2/1960 | Fannen | 425/19 X |
| 3,091,802 | 6/1963 | Rawls | 425/18 |
| 3,130,446 | 4/1964 | Duerksen | 425/20 |
| 3,137,032 | 6/1964 | MacMillan | 425/23 X |
| 3,550,196 | 12/1970 | Gaquit | 425/34 |
| 3,585,679 | 6/1971 | MacMillan et al. | 425/38 X |
| 3,988,077 | 10/1976 | Naratov et al. | 425/34 R X |
| 4,088,524 | 5/1978 | Taylor et al. | 425/18 X |
| 4,131,402 | 12/1978 | Pirovano | 425/38 |
| 4,236,883 | 12/1980 | Turk et al. | 425/38 X |

FOREIGN PATENT DOCUMENTS

| | | | |
|---|---|---|---|
| 99326 | 1/1984 | European Pat. Off. | 425/38 |
| 802014 | 9/1958 | United Kingdom | 425/34 R |
| 502763 | 4/1976 | U.S.S.R. | 425/38 |

Primary Examiner—J. Howard Flint, Jr.
Attorney, Agent, or Firm—McGlew and Tuttle

[57] ABSTRACT

An apparatus for handling tires to be placed in a vulcanizing machine—particularly for retreading the tread or the whole tire—and for the removal of the tire from the machine, comprises: a housing developed along and behind the front of a set of such machines. The housing has a conveyor and slide rails. A carriage is movable on the rails so that it can reach transfer positions near each of the machines. An arm with a plurality of sections and having several degrees of freedom include a drawing device to engage the upper rim of a tire in horizontal position, to transfer it from an open mold on to the conveyor, and to transfer it from a drawing position as far as the open mold of a machine.

6 Claims, 8 Drawing Figures

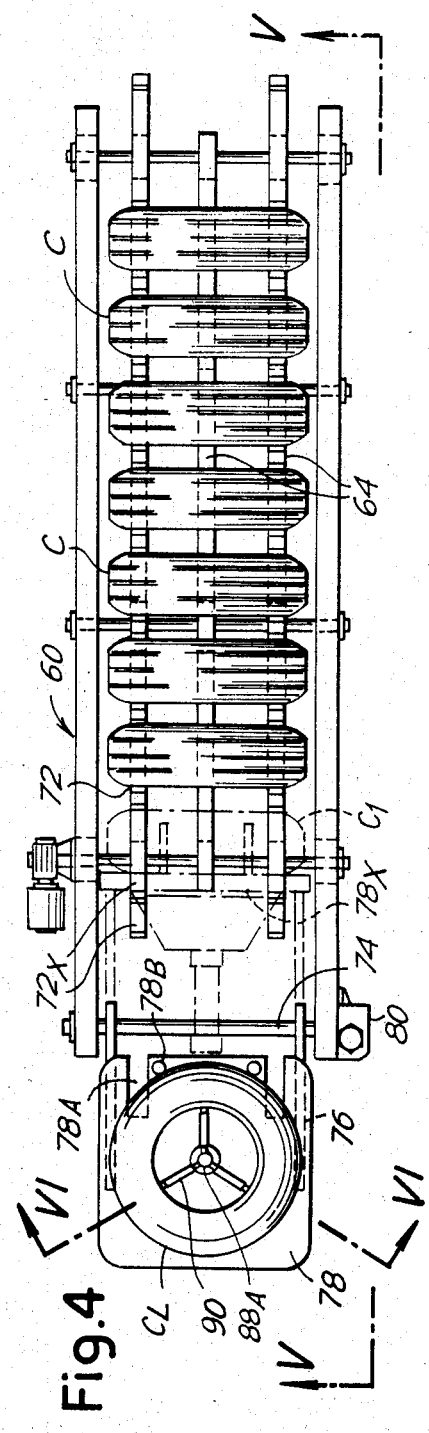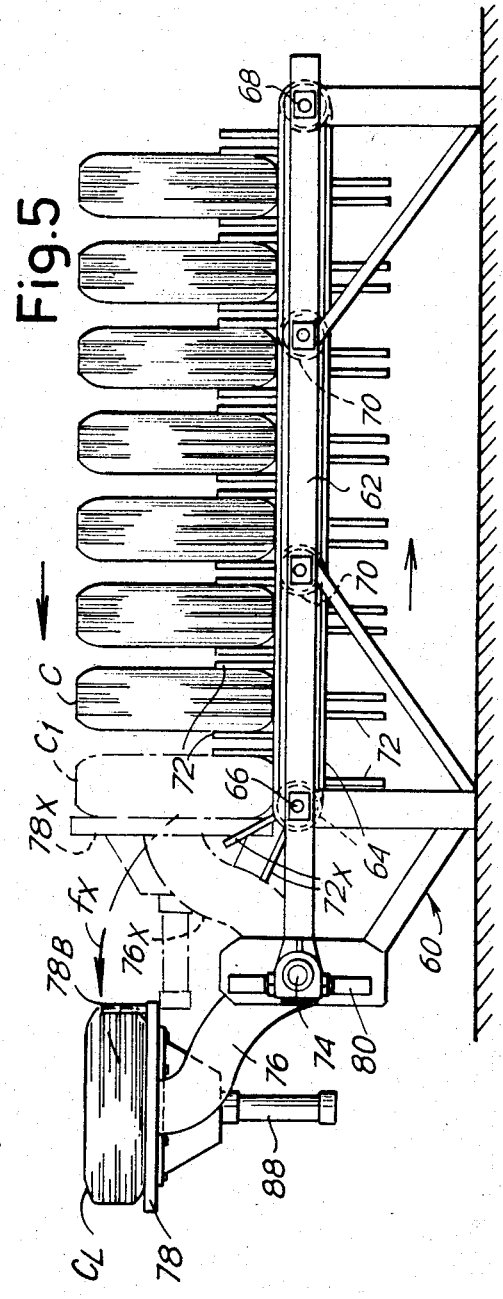

APPARATUS FOR HANDLING TIRES TO AND FROM A VULCANIZING MACHINE

The invention relates to an apparatus for handling tires to be placed in a vulcanizing machine—particularly for retreading the tread or the whole tires—and for the removal of tires from it.

According to the invention, the apparatus comprises in combination:

a housing developed along and behind the front of a set of machines, forming a conveyor and slide rails;

a carriage mobile on said guides to reach transfer positions towards and from each of the machines;

on said carriage an arm with a plurality of sections articulated according to several freedom degrees and with a drawing means to engage the upper rim of a tire in horizontal position, to transfer it from an open mold up onto the conveyor, and to transfer it from a drawing position as far as the open mold of a machine.

Practically, the arm with several articulated sections, has at least four orthogonal and skew articulation axes.

In an advantageous embodiment, the arm with several articulated sections comprises articulated heads, an articulated beam between the two heads, a transmission for the parallel displacement of the two heads with the angular movement of the beam, and a terminal arm with the drawing means.

The apparatus also comprises a storing and feeding group associated with each machine, provided with a reservoir-conveyor of tires, with means for presenting successive tires in a horizontal position, and with means for centering the tire in the horizontal position; thus it is possible to withdraw the tires by means of the arm.

In practice, the storing group may comprise: a continuous conveyor with intermittent motion, having seats to carry the tires in a vertical and transversal direction; transmission means to open the seats and permit the tire inclination; a mobile equipment around a horizontal and transversal axis, with a plate and bracket-like small pillars to receive the tire in an almost vertical resting position and carry it horizontally; and on said plate, means for centering the tire.

In practice, the centering means may include articulated teeth for upward—as well as radially outward—displacements, and means for the simultaneous operating of the above teeth.

The invention will be better understood by a reading of the following description in conjunction with the accompanying drawings which show a practical, non limitative exemplification of the invention itself. In the drawings:

FIG. 4 shows an enlarged and isolated plan view of the storing and feeding group;

FIGS. 5 and 6 show a side view from line V—V of FIG. 4, and a sectional view substantially along the broken line VI—VI of FIG. 4;

Figure 1:
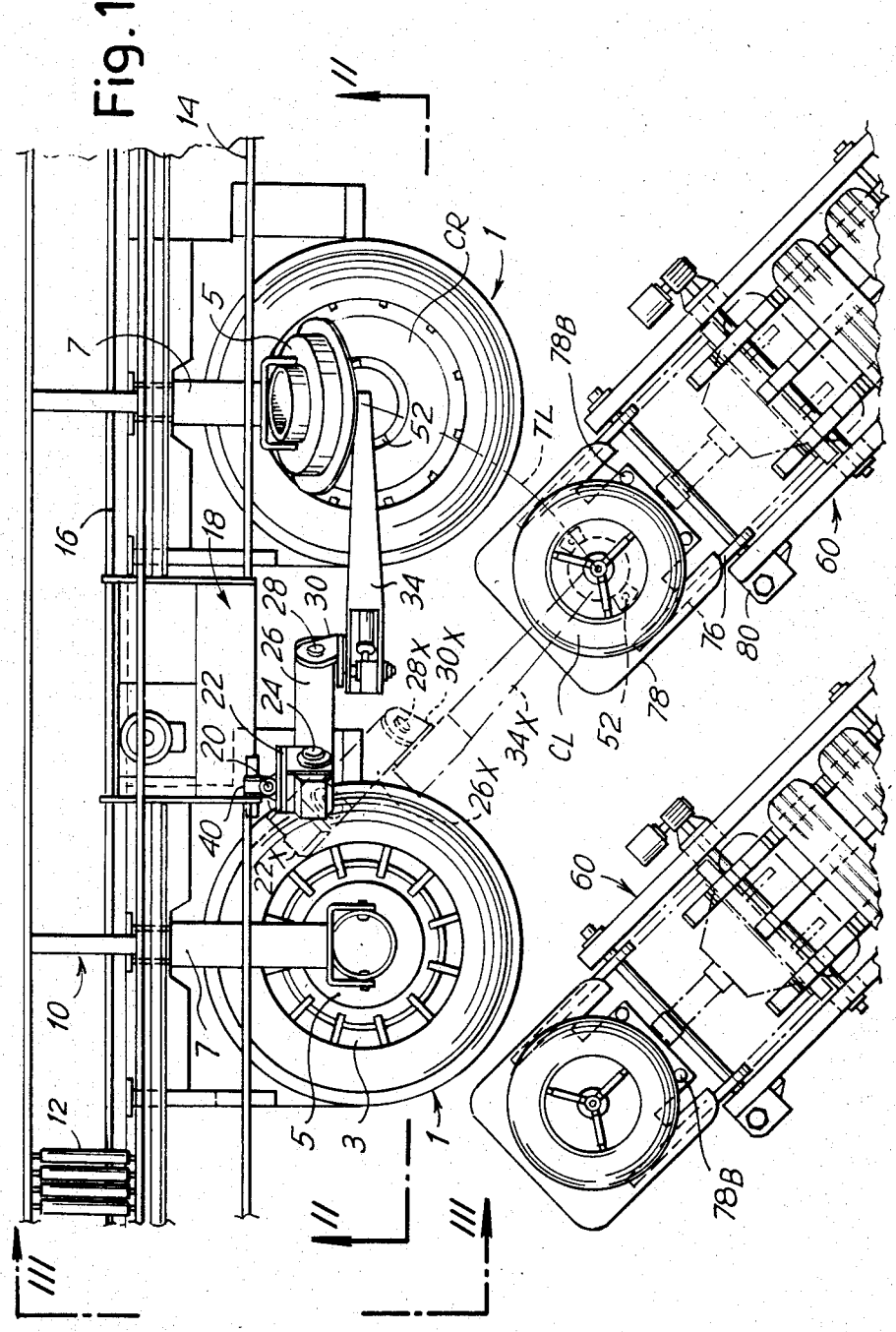
FIG. 1 shows a plan view of a portion of a plant.
Figure 2:
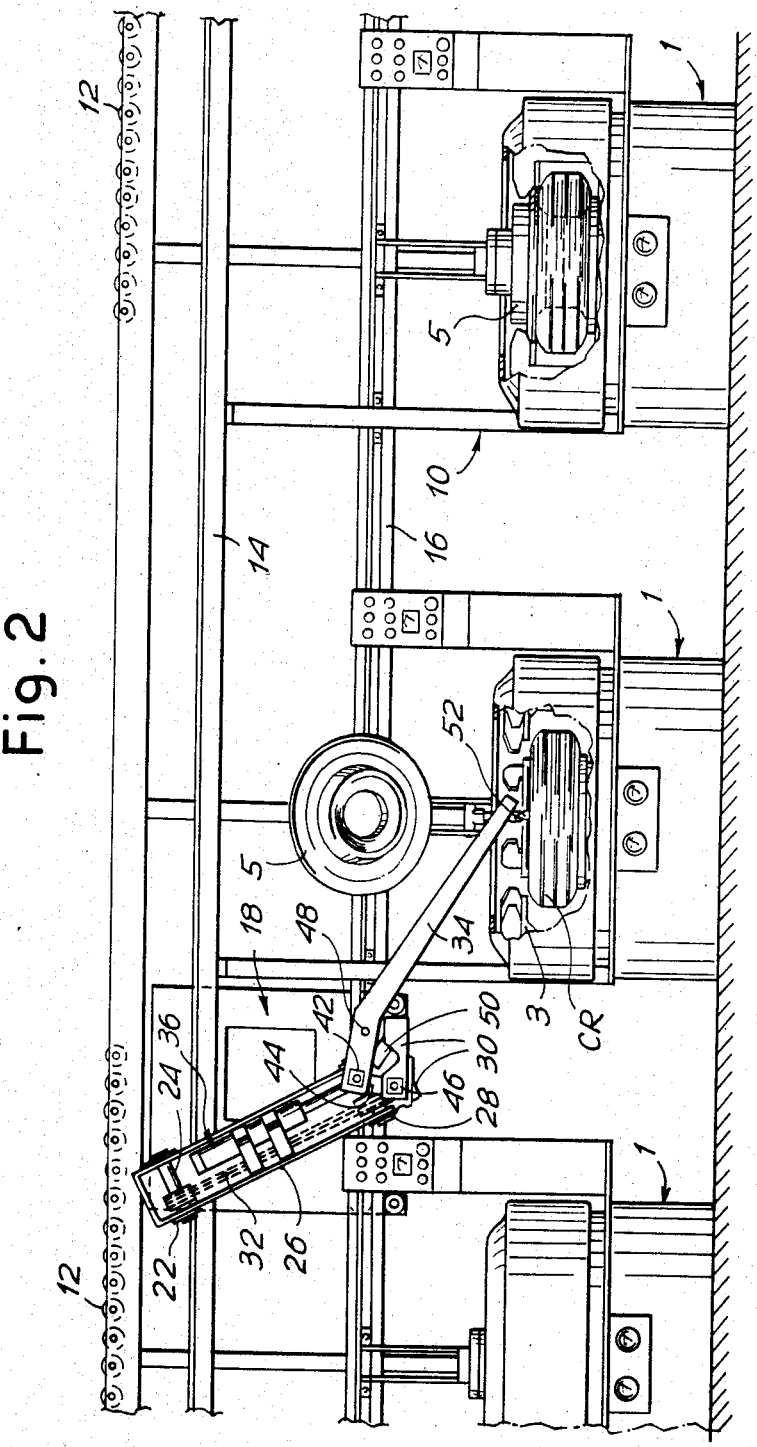
FIG. 2 shows a partial frontal view, substantially taken on line II—II of FIG. 1.
Figure 3:
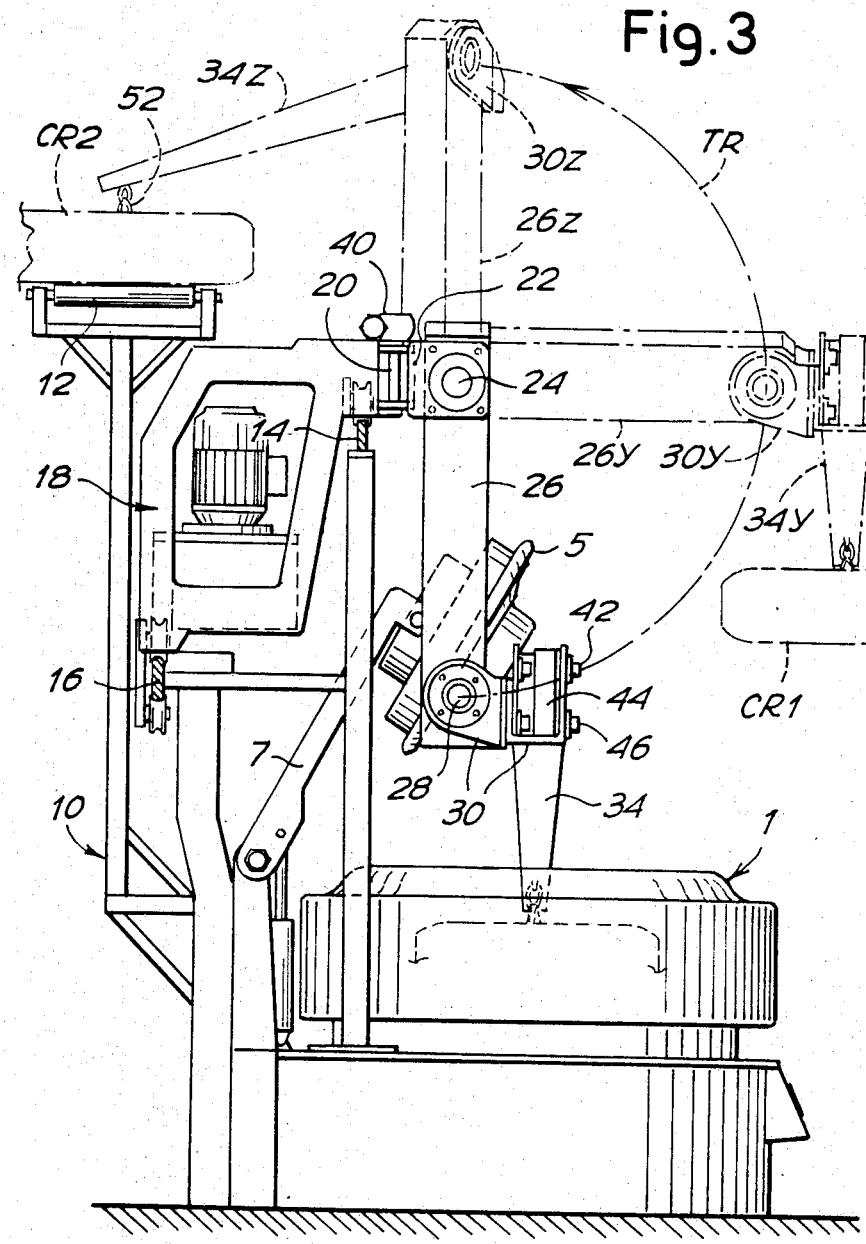
FIG. 3 shows an end view, substantially taken on line III—III of FIG. 1.

According to what is illustrated in the accompanying drawings and first referring to FIGS. 1 to 3, numeral 1 indicates individual vulcanizing machines of traditional type, mostly with molds having sectors 3, with a cover 5 being liftable by an arm 7 and with or without a vertical extractor to lift the tire. The individual machines 1 are lined-up disposed and uniformly oriented to be served by a pick-up and replacement plant capable of alternatively serving the various machines.

To this purpose, a back housing is provided, generally indicated 10, which makes up—in the upper part—a conveyor 12, usually a roll conveyor, which is only partially shown and is intended for receiving the retreaded or regenerated tires to allow for their easy removal. The housing 10 forms also rail guides 14, 16 for the sliding of a shaped carriage 18 which can thus move behind and above the front of the machines 1.

The carriage 18 carries an arm which can be articulated in various directions for handling the tires to be placed in the molds of the vulcanizing machines and to be picked up therefrom and laid down onto the conveyor 12. In particular, a head 22 is mounted for movement onto a vertical articulation axis 20, which head can swing—together with all that is connected thereto—around said vertical axis in a horizontal plane, for example, between the position shown by a solid line and the position 22X shown by a phantom line in FIG. 1. The head 22 carries an axis 24 being inclined with respect to the horizontal and skew with respect to the vertical axis 20. A beam 26 may rotate on the inclined axis 24, in all the positions that can be reached by head 22. From the position shown by solid line in FIGS. 1 and 3, the beam 26 may reach other positions like the one indicated by 26X. At the mobile or free end of beam 26, an articulation axis 28 is formed, being advantageously parallel to the articulation axis 24, to articulate a second head 30. Heads 22 and 30 are kinematically connected—for example through a chain system 32—in order to remain substantially parallel during the angular excursions of beam 26. It is not excluded, however, that some changes may occur in the arrangement of the two heads 22 and 30, due to the angular excursion of the beam 26. The second head 30 carries an articulated end arm 34 especially shaped to be operated by a cam system to be described below.

In particular, the actuating system of beam 26 may consist of a cylinder-piston system 36, combined with chains 32 for the actuation of the beam through the reaction of the chain wheels carried by axis 24. The head 22 may be operated by a motor system 40 which reacts on the carriage 18. The end arm 34 is articulated at 42 with a connecting rod 44 being articulated at 46 with the head 30. A stylus, summarily illustrated in 48 cooperates with a cam profile (not shown) carried by head 30 in order to obtain a predetermined pattern of movement of the arm 34 when the articulation 42 is moved with a degree of freedom allowed by the connecting rod 44. A cylinder-piston operating system 50 causes, by reacting on head 30, the movements of articulation 42 around the articulation 46 and thus the movements of the end arm 34 according to the pattern imposed by the above mentioned cam profile.

At the mobile or free end of the terminal arm 34 a system to pick up a tire is provided, generally indicated by 52 and capable of engaging the bead or rim of the tire to be handled in a horizontal arrangement, for example, and also, to move a regenerated tire CR from the open mold, which has vulcanized it, on to the conveyor 12. To perform this function, the carriage 18 is brought, for example, to the position shown in FIG. 1, and the articulated arm made up of the components 20, 22, 24, 26, 28, 30, 34 is lowered to the position shown in FIGS. 1 to 3 and is able to pick up the tire CR since the cover is lifted. The cover begins to be raised in an approximately vertical direction and then is shifted as shown in FIG. 3 to reach, through intermediate positions like the ones indicated by CR1 and according to trajectories TR of the arm components, the position CR2 where it is abandoned by the drawing system 52 onto the conveyor 12. The combined trajectories are obtainable by programmed controls of the movements around articulations 24, 28, 46, 42 and by the above mentioned cam profile, and avoid the cover 5 when it is raised. The articulated arm positions shown with dotted lines 26Y, 30Y, 34Y and 26Z, 30Z, 34Z (FIG. 3) are reached for drawing a retreaded tire CR, just vulcanized, from its mold and for transferring it onto the conveyor 12 for its removal. Immediately after this operation, the program controlling the articulated arm causes the same arm displacement from the position 26Z, 30Z, 34Z (FIG. 3) as far as the lowered and rotated position shown with 22X, 26X, 30X, 34X (FIG. 1), where the drawing system 52 is able to engage a tire to be worked CL, for its transfer from a position where it is properly presented as far as the open mold of the machine, from which the retreaded tire CR has just before been drawn in the above mentioned way. The articulated arm is operated by the program to raise the tire CL, transfer it along the trajectory TL (FIG. 1) and lay it in the mold ready for its reception. It is not excluded that the loading operation of a tire CL may be carried out not immediately after a retreaded tire CR has been drawn. After positioning a tire CL in the open mold, the machine is operated for closing the mold and for the vulcanizing cycle, the articulated arm being moved away in time in order not to interfere with the cover 5 running through its closing trajectory.

The carriage 18 is in time brought again into its operative position with respect to the various machines 1, whenever a machine has completed its own vulcanizing cycle, with an adequate and possible phase difference with respect to the cycles of the other machines.

Figure 6:
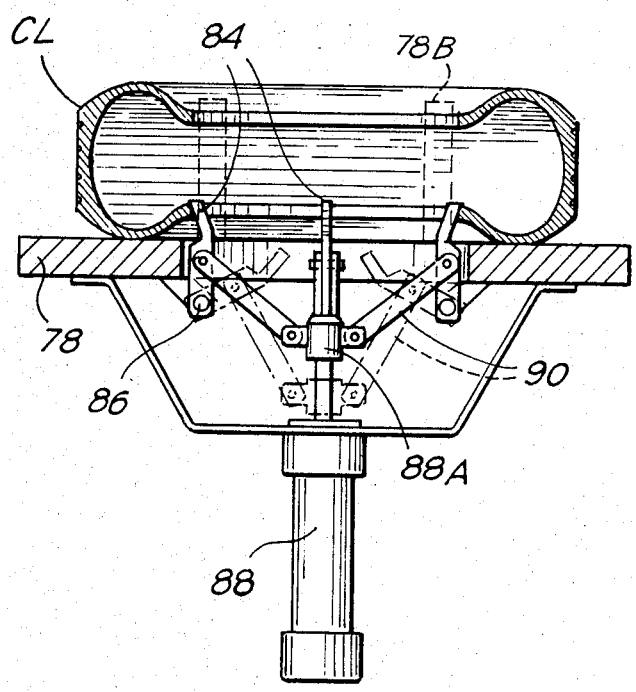
Figure 8:
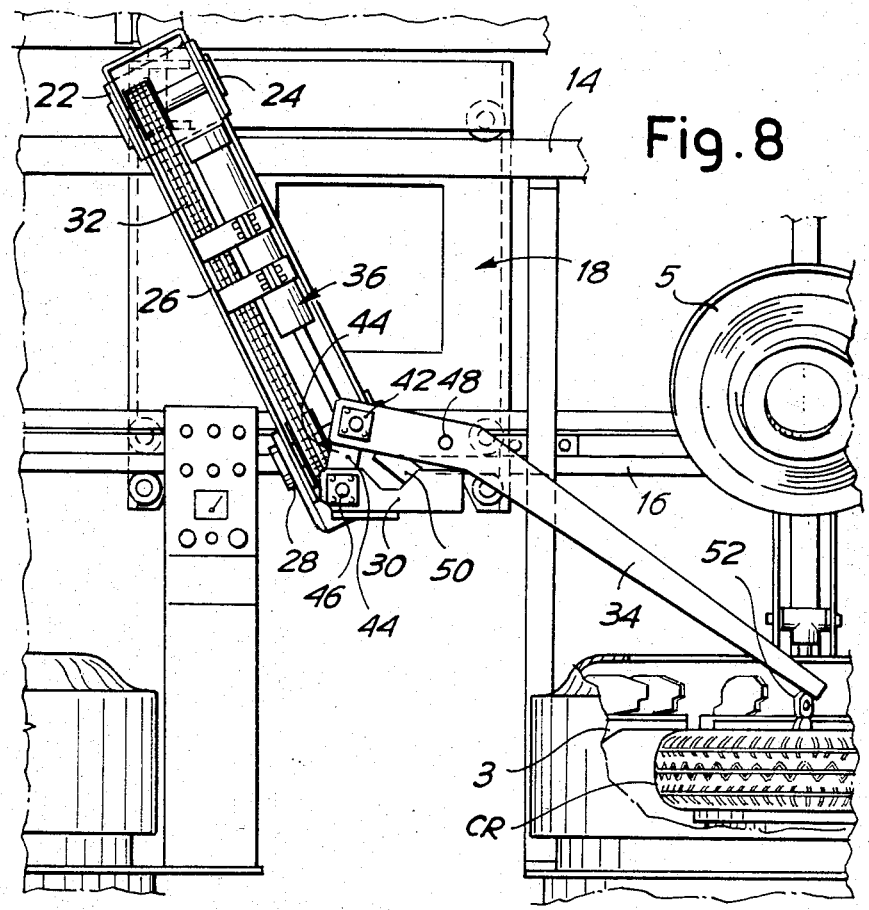
FIGS. 7 and 8 show enlarged details of FIGS. 1 and 2.
Figure 7:
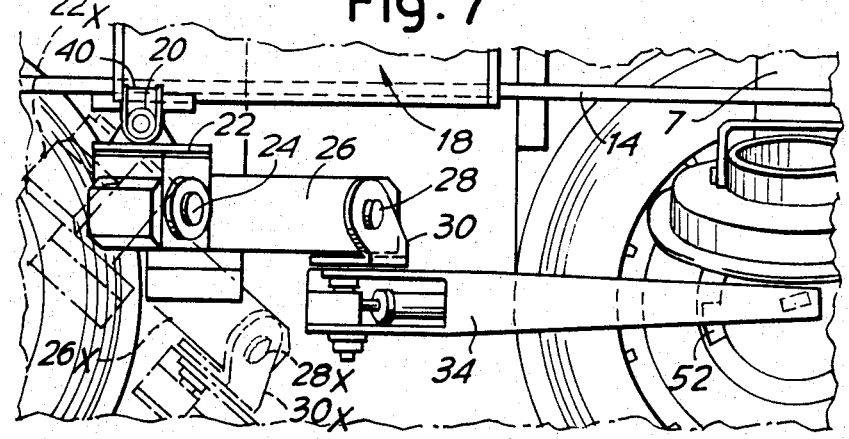

Each machine 1 is associated with a supplying, storing and feeding group partially shown in FIG. 1 and better shown in FIGS. 4 to 6. Each storing and feeding group is generally indicated by 60 and comprises a framework 62 supporting a chain conveyor 64 driven around end axes 66 and 68 and also advantageously supported by intermediate guide means, developed as bearing rolls or wheels 70 and possible auxiliary rails. The conveyor 64 has seats 72 for tires C, which are placed on the conveyor 64 in the seats provided along the conveyor upper branch, to make up a storing reservoir for tires of the same type to be fed to the same machine. Each of the seats 72 is made up of a pair of appendixes singularly combined with the chains of the conveyor 64. These appendixes move along the driving wheels and, in particular, along the wheel provided around the axis 66 reached by the conveyor upper branch. At this point the appendixes progressively and indipendently tilt as shown in 72X in FIGS. 4 and 5. Accordingly, a tire C reaching the position C1 is no longer firmly held by the appendixes forming the seat for the tire in position C1. At the end of the housing 62, where the transmission axis 66 is located, there is an equipment made up by arms 76 and a plate 78 which is articulated at 74. A drive system 80 can move the equipment 76, 78 around the axis 74, from the position shown by solid line up to the position 76X, 78X and viceversa. In the position 76X, 78X, said equipment has the plate 78 in such a position as to make contact with the tire that reaches position C1. Plate 78 presents slots, that is, notches 78A, which permit the passage of the appendixes of seats 72 when they tilt, as indicated by 72X, around the driving wheel on the axis 66. The plate 78 presents also a pair of small pillars 78B, which are located immediately below the tire in the position C1 when the plate 78 is in the position 78X and the tire approaches the position C1. Owing to this arrangement, the tire in the position C1 can be picked up by the equipment 76, 78 when the tire in position C1 approaches the plate 78X and this is moved according to the arrow fx from the position 76X, 78X up to the position shown by solid line, with the plate 78 being horizontal. The tire which has reached the position C1 is thus brought in the horizontal position CL to be picked up and worked.

The tire in position C1 must be centered so as to have its own axis in an exactly defined position to consent the drawing of the same tire by the articulated arm 22, 26, 30, 34. This occurs automatically, with pillars 78B picking up the plate 78 only when tires are present having the maximum diameter which has been devised when designing the group 60. When tires having lower diameter are to be worked, they are not automatically centered; and, anyway, it is always advisable to provide for an accurate centering of the tire in the position CL on the horizontal plate 78. To this purpose, a centering device is provided, as can be better seen in FIGS. 4 and 6, which acts on the lower rim or bead of the tire in position CL. This device comprises a set of centering fingers 84 which are articulated at 86 below the plate 78 suitably centrally open; fingers 84—from a position (shown in dotted line in FIG. 6) where they are lowered and brought near the center of plate 78—may be lifted and radially displaced in centrifugal direction by a sole and underlying cylinder-piston driving system 88, whose movable head 88A drives the single fingers 84 through small connecting rods 90. In this way, a tire in position CL, but not centered, is automatically centered by the fingers 84 which have been raised and spread apart simultaneously and symmetrically. This is possible for a certain range of diameters of the inner rim belonging to tires of different type.

In any case, a tire from the storage built up by the conveyor of group 60, may be accurately positioned in a horizontal arrangement, as shown in CL, to be drawn, as above mentioned, by the articulated arm, as previously indicated.

It should be understood that the drawings show an exemplification given only as a practical demonstration of the invention as said invention may vary in the forms and dispositions without, nevertheless, leaving the principles of the invention.

What is claimed is:

1. An apparatus for handling tires to be placed in vulcanizing machines and for removing tires from the vulcanizing machines, comprising in combination, a housing disposed adjacent the machines; a conveyor for moving tires mounted to said housing; guide rails mounted to said housing and extending past the machines; a carriage mounted for movement on said guide rails for reaching transfer positions which are each near one of the machines; an arm having one end connected to said carriage at an opposite free end, said arm having a plurality of articulated sections which are articulated to each other to establish a plurality of degrees of freedom for movement of said free end of said arm with respect to said carriage; and drawing means connected to said free end of said arm for engaging an upper rim of a tire lying in a horizontal drawing position, the vulcanizing machines having molds which are openable, said sections of said arm being articulated for transferring tires from an open mold to said conveyor and from the horizontal drawing positions to an open mold of a vulcanizing machine.

2. An apparatus according to claim 1, wherein said plurality of articulated sections are connected together at at least four orthogonal and skew articulation axes.

3. An apparatus according to claim 1, wherein one of said sections of said arm comprises an articulated beam, two articulated heads connected to opposite ends of said beam and articulated to said beam, transmission means connected between said two heads for parallel displacement of said two heads with angular movement of said beam, and an end arm having one end connected to one of said two heads at an opposite free end, said drawing means being connected to said opposite free end of said end arm.

4. An apparatus according to claim 1, including a storing and feeding group for each machine, provided with a reservoir-conveyor for tires, said storing and feeding group including means for presenting successive tires in a horizontal position and having means for centering each tire in its horizontal position to bring each tire into the horizontal drawing position for engagement of the tire by said drawing means.

5. An apparatus according to claim 4, wherein said storing and feeding group comprises an endless conveyor, means for intermittently moving said endless conveyor, said endless conveyor having a plurality of seats each for carrying a tire in a vertical position and for moving the tire in a transverse direction along said endless conveyor, said endless conveyor including transmission means for successively opening each seat to permit a tire therein to move from a vertical position into an inclined position, a mobile equipment for movement about a horizontal and a transverse axis, said mobile equipment having a plate and bracket-like small pillars for receiving a tire in its vertical position just as the tire is moving into its inclined position and for carrying the tire into a horizontal position, and means for centering tires connected to said plate for centering a tire on said plate into its horizontal drawing position.

6. An apparatus according to claim 5, wherein said centering means comprises articulated teeth for upward and radially outward displacement, and means for simultaneously operating said teeth for moving a tire on said plate.

* * * * *